UNITED STATES PATENT OFFICE.

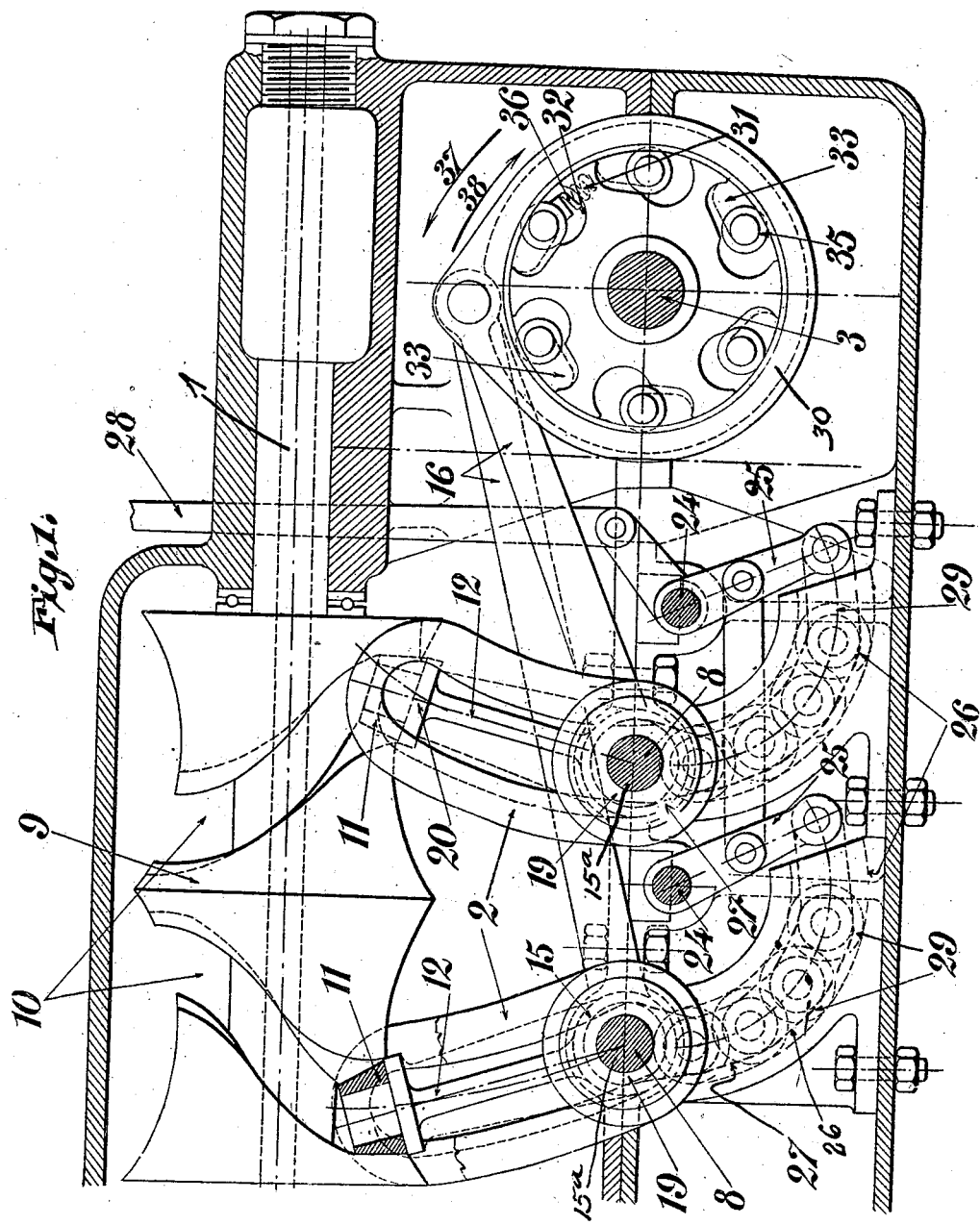

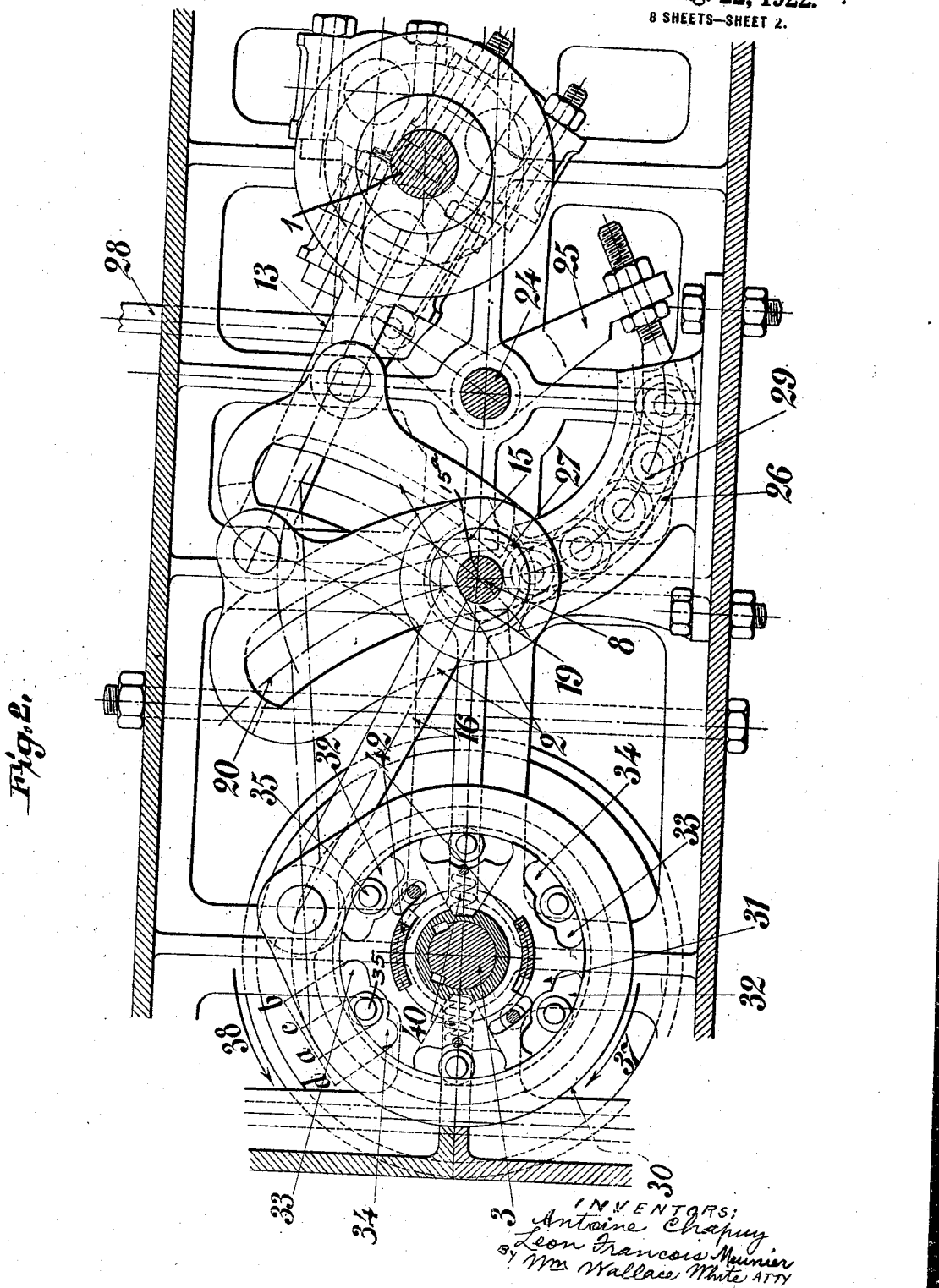

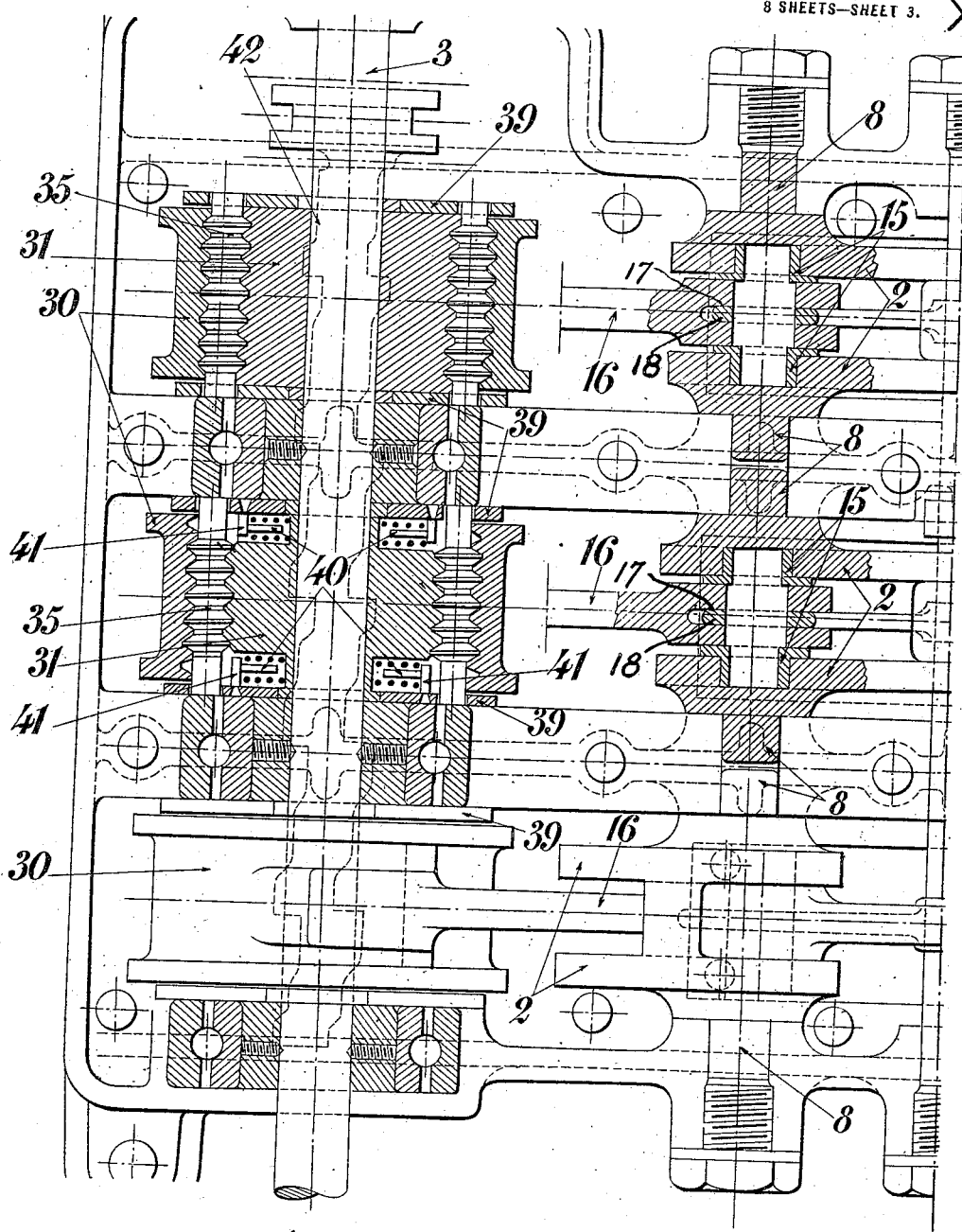

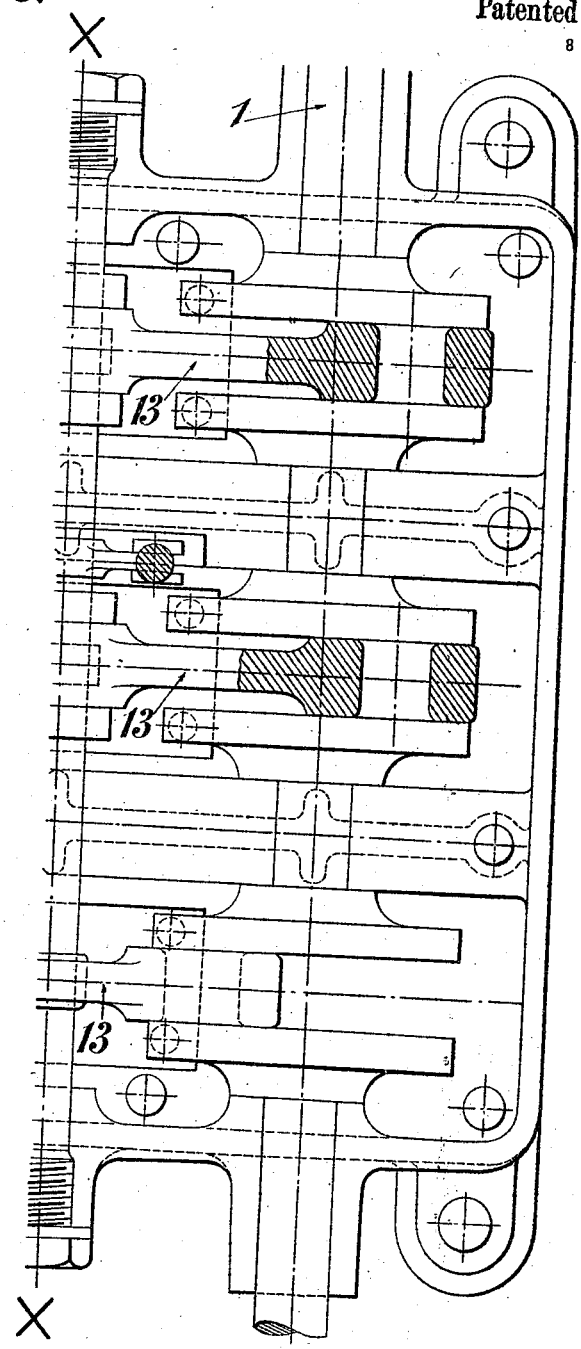

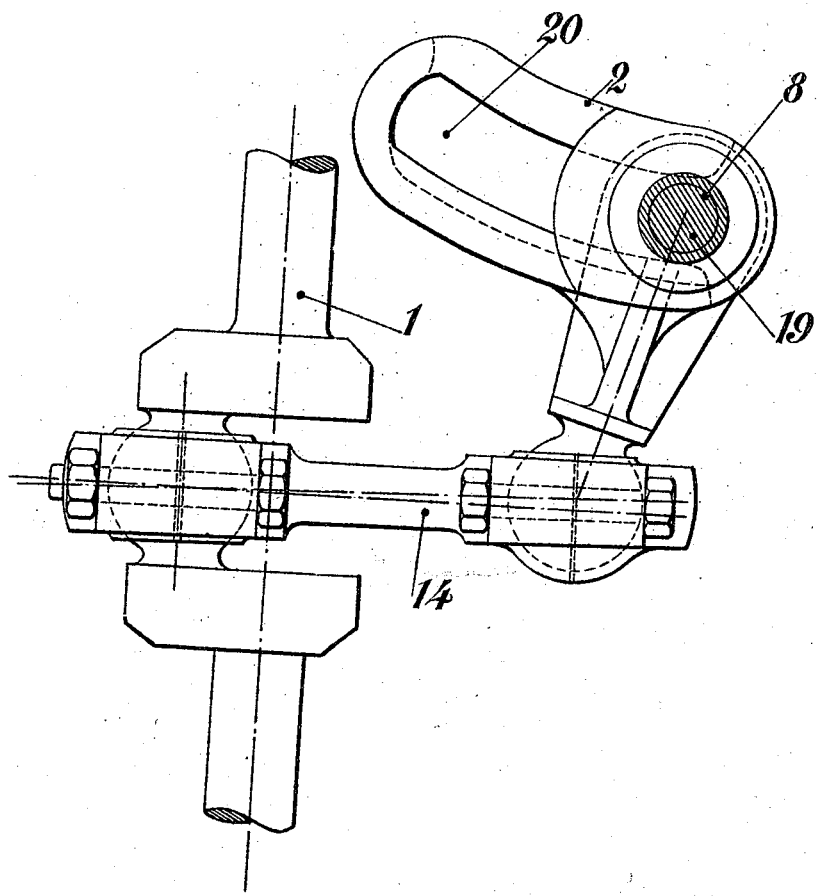

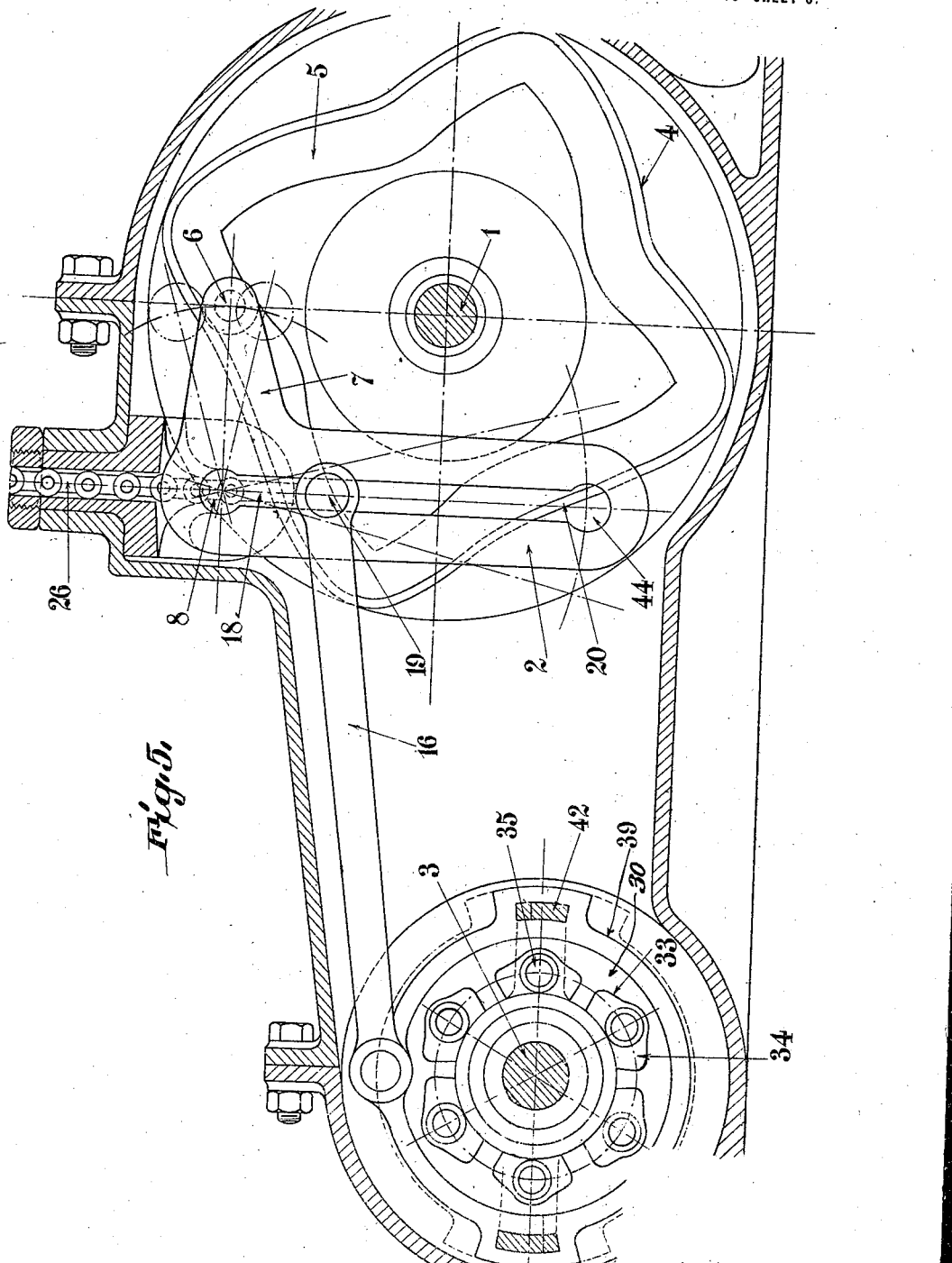

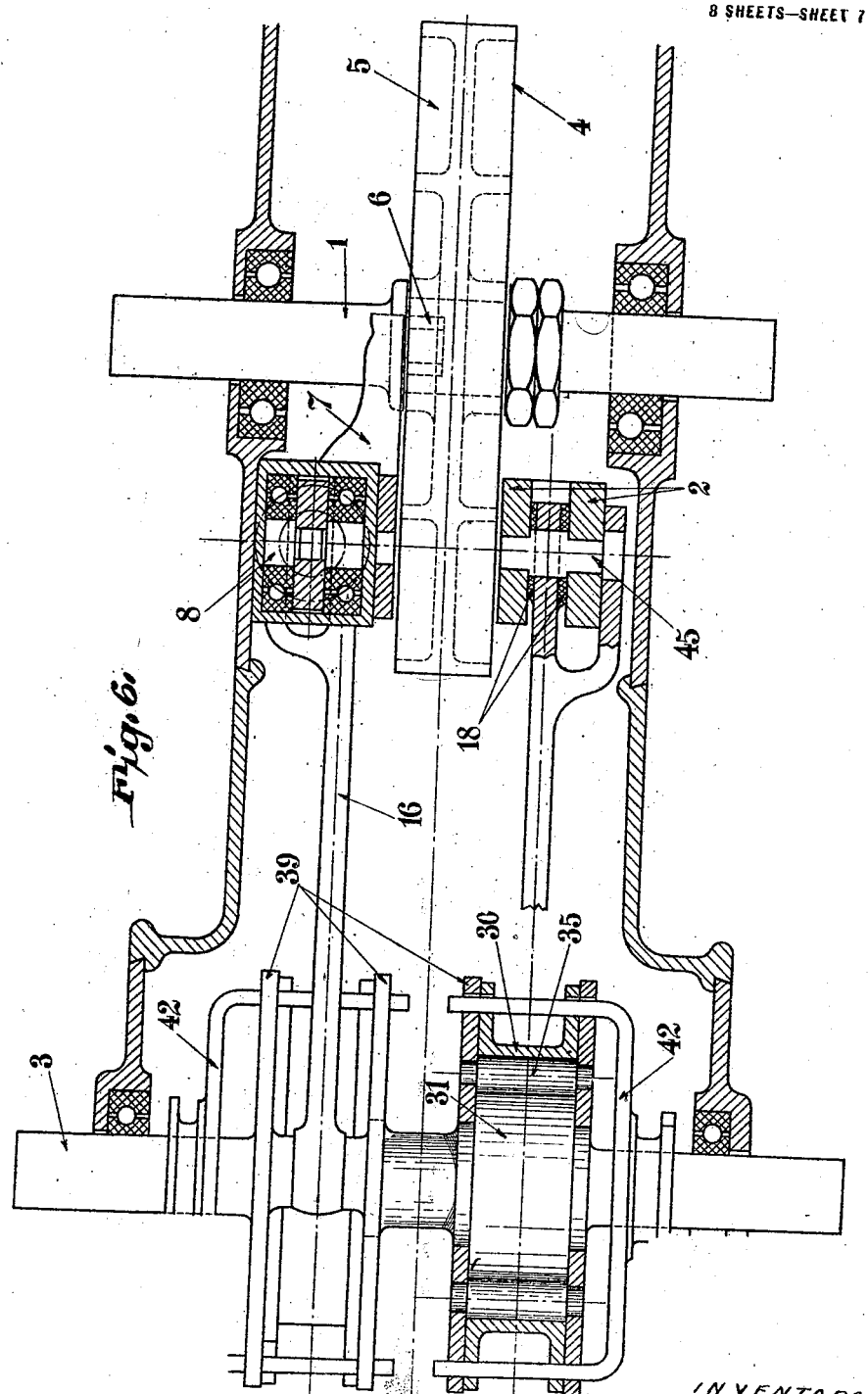

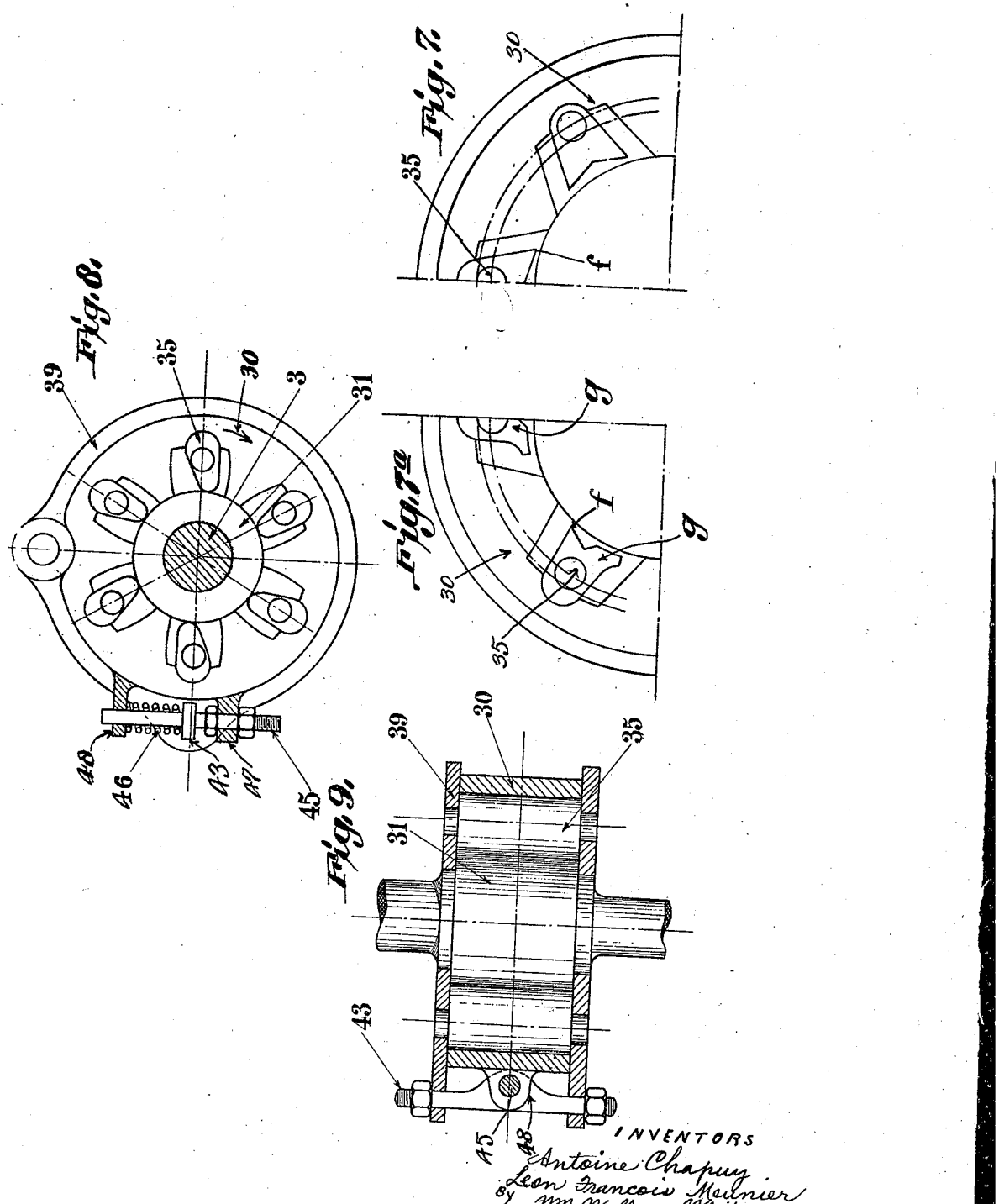

ANTOINE CHAPUY AND LEON FRANCOIS MEUNIER, OF ST. ETIENNE, FRANCE.

VARIABLE-SPEED-TRANSMISSION DEVICE.

1,426,358.  Specification of Letters Patent.  Patented Aug. 22, 1922.

Application filed December 12, 1918. Serial No. 266,405.

*To all whom it may concern:*

Be it known that we, ANTOINE CHAPUY and LEON FRANCOIS MEUNIER, citizens of the Republic of France, residing at, respectively, 85 Rue Marengo à St. Etienne, Loire, and 4 Rue Girodet à St. Etienne, Loire, in the Republic of France, have invented new and useful Improvements in Variable-Speed-Transmission Devices, of which the following is a specification.

This invention relates to a power transmitting mechanism of the variable speed type, in which the rotary movement of the driving shaft is transmitted to the driven shaft through the medium of cams or cranks mounted on the driving shaft and actuating one or more oscillating slotted links journalled on fixed trunnions. Said slotted links are connected by connecting rods to an oscillating crown or intermediate member mounted coaxially with the driven shaft and in operative connection with a rotary drum or similar intermediate member keyed on said shaft. Said operative connection is effected by means of clutch members comprising rollers or wedge like members and cooperating surfaces formed on one of the said intermediate members or on annular plate interposed between said intermediate members. A controlling device comprising a screw and nut arrangement or a lever and articulated chains is provided for shifting the end of each connecting rod along the corresponding slotted link whereby the speed ratio may be varied as desired. By shifting the clutch members to another operative position, the direction of the movement transmitted to the driven shaft may be reversed, the driving shaft rotating still in the same direction.

In the accompanying drawings,

Fig. 1 is a vertical section of a mechanism in which the driving and receiving shafts are set at right angles, the receiving shaft turning in one direction only.

Fig. 2 is a sectional elevation of a mechanism in which the receiving shaft is reversible, that is to say can turn in one or the opposite direction. The sectional plan is shown on two sheets for the sake of convenience and comprises the two Figures 3 and 3ª which should be joined along line X—X.

Fig. 4 shows a detail of the link gear in case of perpendicular driving and receiving shafts, the latter being reversible.

Figs. 5 and 6 show another form of driving gear.

Fig. 7 is part side elevation of a different type of clutch members.

Fig. 7ª is a modified arrangement of the same.

Fig. 8 shows another type of clutch members.

Fig. 9 is a corresponding axial section of the same.

In these drawings like letters of reference indicate corresponding parts.

Whichever may be the application to be considered, the driving gear consists essentially of a driving shaft 1 imparting an oscillating or rocking motion to the links 2 which set the receiving shaft 3 in motion.

Each link is formed of two sides integral one with the other and each provided with a housing forming path for a sliding block 15 jointed to the auxiliary rod 16 serving to actuate indirectly the receiving shaft. The radius of the circular arc of each path has a length equal to that of the auxiliary rod.

The auxiliary rods 16 are each provided at one end with a slot 17 through which extends a small connecting rod 18 surrounding the axle pin 15ª of the rod 16 and by means of which the sliding blocks 15 of the rod 16 may be shifted in the corresponding link 2, thus allowing through a displacement from position 19 to position 20 the receiving shaft to pass progressively from a complete stoppage to half the speed of the driving shaft.

The auxiliary rods 16 impart a rotary motion to the receiving shaft by means of the following device. Coaxially with the said shaft 3 is mounted an oscillating crown or intermediate member 30 to which the connecting rods 16 are respectively connected. Each crown 30 has a circular bore and rotates upon a rotary intermediate member or core 31 keyed upon the receiving shaft and provided with housings 32 having each a single inclined roller recess or gradient 33. In these housings are arranged ribbed or fluted rollers 35, the crown pieces 30 as well as the core gradients being grooved to correspond exactly with the roller flutes. Springs 36 act to force the rollers 35 into engagement between the members 30 and 31 so as to form a one-way clutch therewith.

The operation is as follows: The driving shaft 1 imparts a rotary movement to the cam plates 4 which oscillate the slotted links 2 about the fixed axes 8.

When the crown 30 is oscillated by the connecting rod 16 in the reversed direction (arrow 38) the rollers are forced back in their recesses in opposition to the springs 36 and the shaft 3 is not actuated. It will be thus seen that when the rods 16 act as pulling members the receiving shaft is rotated in the direction indicated by the arrow 37, but when they act as pushing members, the crown pieces only turn in the direction indicated by the arrow 38 on their return to the position of engagement with the rollers. The successive to and fro motion of the crown pieces will thus impart a rotation to the receiving shaft.

To impart a reversible motion to the receiving shaft, the housings 32 are provided with two gradients 33 and 34 (Figs. 2 and 3) and one or the other series of gradients is brought into play according to the direction of motion required. For this purpose two discs 39 are used for each driving part and are mounted upon the core wherein are held the ends of the roller 35, their object being to shift these rollers to the left or right hand side of the position they occupy in Fig. 2. The discs 39 are connected to the corresponding core 31 by springs 40 held under compression against the core by pistons 41. A sloping trigger 42 movable on the receiver shaft allows these discs 39 to be shifted in the direction indicated by the arrow 37 or by the arrow 38. By stretching the springs 40 by means of the said trigger a tangential action is exerted on the rollers 35 in one direction or in the other so that for each position of the said trigger the rollers can only move between the points $a$ and $b$ with a tangential action of the springs in the direction indicated by the arrow 37 and that for another position these rollers can only move between the points $c$ and $d$ with a tangential action of the springs in the direction indicated by the arrow 38.

The biting action of the crown pieces 30 is very energetic on account of the shape of the roller ribs or flutes which produce an instantaneous wedging or locking action thus avoiding skidding.

Dead points are avoided by combining the link actuating device so that each crown piece is constantly engaged while the neighbouring one is free.

In gears for reversible motion such as above described, the sectional shape of the gradients of the trigger is not the same in all cases but is so calculated as to change the direction of motion, the driving parts at work being successively thrown out of gear, and successively put into gear again for working in a reverse direction. In case of heavy duty mechanisms the guide blocks 15 containing the axle pins $15^a$ of the connecting rods 16 are preferably shifted along the slotted links by means of one or two shafts 24 controlled by means of a lever 28 (Figs. 1 and 2). Said shafts actuate the blocks 15 by means of levers 25, chains 26 guided upon rollers 29 and small connecting rods 27. By pushing down the lever 28, the sliding blocks 15 may be gradually moved from position 19 to position 20 and vice-versa.

In the arrangement shown in Fig. 1, the shaft 1 is provided with a cam drum 9 formed with two roller paths 10 in each of which rolls a roller 11 carried by an arm 12 actuating a link 2. The two roller paths 10 are symmetrically arranged with respect to a transversal plane at right angles to the axis of the cam.

In the construction shown in Figs. 2, 3 and $3^a$, the slotted links 2 are actuated by means of a crank shaft with three cranks arranged at 120° operating three connecting rods 13.

When the driving and receiving shafts are at right angles to each other and the receiving shaft is reversible, a crank shaft with two or even three cranks is used as shown in Fig. 4 and drives the links 2 by connecting rods 14, provided with universal joints at their ends.

With reference to Figs. 5 and 6, it will be seen that the discs 4 may have roller paths 5 constructed to impart 2, 3, 4 ..... n oscillations to the links 2 at each turn of the driving shaft, whence arises the possibility of obtaining a greater speed capable of exceeding even that of the shaft 1.

Each of the links 2 is formed of two side members and is connected to the forked end of one of the connecting rods 16. By using such connecting rods having a forked end it will however be possible to form the links 2 of a single member.

Each link 2 is provided at its lower part with an opening 44 through which the pivot 45 of the connecting rod 16 may be inserted into position. Said pivot is provided with flattened parts in contact with the link, whereby the guide block 15 may be dispensed with. It may be remarked that with a very long rod 16 the slot in the link 2 may be made straight instead of curved (Fig. 5).

With reference to Figs. 5, 6, 7, 8 and 9, the core 31 is entirely circular. In Figs. 5 and 6 the crown piece 30 is provided with gradients 33, 34 for reversing cases. The rollers 35 are entirely smooth or convex in the middle and have their journals held by the discs 39, but the connecting rod 16 engages these discs. The trigger 42 above mentioned is used to shift the crown piece 30 in such a manner as in operative position to present either its gradients 33 or 34 to impart a forward or a backward motion.

For very small powers, the rollers 35 have the shape shown in Fig. 7. They are inserted at their outer part in the crown 30 and the trunnions provided at their ends are still carried by the discs 39. Said trunnions are eccentric relatively to the circular outer part of the rollers so that by actuating the trigger 42 the apices *e* or *f* of each roller are brought into contact with the core 31 whereby the driven shaft is caused to turn either forward or backward.

For driving parts which need not be reversible and when a brake is required on the driven shaft, it will be sufficient to provide a flattened shoe part *g* at one of the apices *e* or *f*. In the case of a non reversible gearing the rollers or wedges may also be provided with only one rounded apex as shown in Figs. 8 and 9. Through the discs 39 extends a cross piece 43 which is secured to the same and may slide along a rod 45 secured on a lug 47 provided on the crown or drum 30, said rod 45 extending through a similar lug 48 on said drum. A spring 46 placed between the cross piece 43 and the lug 48 tends to force the drum 30 in the direction of the arrow whereby the rollers 35 are held in contact with the core 31.

Having now described our invention, what we claim as new and desire to secure by Letters Patent is:

A power transmitting mechanism comprising in combination a driving shaft, an oscillating slotted link pivoted at a fixed point, means for operatively connecting the driving shaft to the slotted link, a driven shaft, an intermediate rotary member keyed on said driven shaft, an intermediate oscillating member arranged coaxially on said rotary intermediate member, clutch members for operatively connecting the intermediate members to each other, a connecting rod pivotally connected at one end to the oscillating intermediate member, the opposite end of said connecting rod being pivoted in the slotted link, a guide, a chain movable in said guide and having one end connected to said opposite end of the connecting rod and means for operating said chain.

In testimony whereof we have signed our names to this specification.

ANTOINE CHAPUY. [L. S.]
LEON FRANCOIS MEUNIER. [L. S.]